US008690606B2

(12) United States Patent
Kalavitz

(10) Patent No.: US 8,690,606 B2
(45) Date of Patent: Apr. 8, 2014

(54) ELECTRICAL INTERFACE AND METHOD

(76) Inventor: Michael V. Kalavitz, Plainwell, MI (US)

( * ) Notice: Subject to any disclaimer, the term of this patent is extended or adjusted under 35 U.S.C. 154(b) by 38 days.

(21) Appl. No.: 13/459,788

(22) Filed: Apr. 30, 2012

(65) Prior Publication Data
US 2012/0289082 A1 Nov. 15, 2012

Related U.S. Application Data

(60) Provisional application No. 61/484,646, filed on May 10, 2011.

(51) Int. Cl.
H01J 5/50 (2006.01)

(52) U.S. Cl.
USPC .......................................... 439/611

(58) Field of Classification Search
USPC ............................ 362/493; 439/611, 612, 660
See application file for complete search history.

(56) References Cited

U.S. PATENT DOCUMENTS 4,633,215 A * 12/1986 Anders et al. ................. 340/473
6,250,967 B1 * 6/2001 Chu .............................. 439/668

* cited by examiner

Primary Examiner — Phuong Dinh
(74) Attorney, Agent, or Firm — Joseph Stecewycz

(57) ABSTRACT

A mounting base is disclosed comprising: a base housing configured to retain an electrical connector at a first base housing end and a flexible shaft at a second base housing end, the base housing providing an electrical path between the electrical connector and a first electrical wire in the flexible shaft; a contact spring for providing an electrical connection to a power terminal on the electrical connector; a insulation sleeve enclosing the contact spring; a contact eyelet electrically attached to a second electrical wire in the flexible shaft, the contact eyelet in electrical contact with the contact spring; and a grounding collar disposed against an end of the flexible shaft, the grounding collar disposed within an interior channel in the second base housing end.

19 Claims, 8 Drawing Sheets

ELECTRICAL INTERFACE AND METHOD

CROSS REFERENCE TO RELATED APPLICATION

The present Application is related to Provisional Patent Application entitled "Electrical Interface and Method," filed 10 May 2011 and assigned filing No. 61/484,646, and is incorporated herein by reference in its entirety.

FIELD OF THE INVENTION

The present invention relates generally to electrically-conductive mounted masts and whips, and more specifically, to an electrical interface and method suitable for use with such masts and whips.

BACKGROUND OF THE INVENTION

Lighted safety whips and masts, have been known in the art, and widely manufactured, for nearly forty years. A relatively small number of whip manufacturers produce such products for the retail consumer market. However, it is generally known that normal use of such devices may result in electrical connection problems on the safety whip. A lighted safety whip, for example, may encounter an electrical problem where a lamp socket is attached to the top of a supporting fiberglass rod, or where a mounting base is attached to the bottom of the safety whip, regardless of the particular manufacturer of the safety whip.

It has been observed that many of these lighted safety whips fail as a result of poor electrical connections at the top or bottom of the whip. Moreover, many failures have been known to occur even before the lighted safety whips are placed into service, or shortly thereafter. Generally, a failure at either of these electrical connective locations, at the mounting base or at the lamp socket, may cause the mounted lamp to flicker while in use or, worse yet, the lamp will not illuminate at all.

What is needed is an electrical attachment design, which overcomes problems of the current state of the art by providing an innovative electrical interface to insure a secure electrical mast connection, and by simplifying the fabrication of lighted safety whips.

BRIEF SUMMARY OF THE INVENTION

In one aspect of the present invention, a mounting base suitable for use in attaching a flexible shaft having electrical wires routed therethrough to an electrical connector comprises: a base housing configured to retain the electrical connector at a first base housing end, and further configured to retain the flexible shaft at a second base housing end, the base housing providing at least a portion of an electrical path between the electrical connector and a first electrical wire in the flexible shaft; a contact spring for providing an electrical connection to a power terminal on the electrical connector; a insulation sleeve substantially enclosing the contact spring; a contact eyelet electrically attached to a second electrical wire in the flexible shaft, the contact eyelet in electrical contact with the contact spring; and a grounding collar disposed against an end of the flexible shaft, the grounding collar disposed within an interior channel in the second base housing end.

In another aspect of the present invention, a safety whip comprises: a flexible shaft; at least one of an emergency light, a flag, and a global positioning system device, disposed at a first end of the flexible shaft; and a mounting base connected to a second end of the flexible shaft, the mounting base having a grounding collar electrically connected to a ground wire disposed inside the flexible shaft, the grounding collar in electrical contact with the mounting base.

In yet another aspect of the present invention, a method for electrically connecting a mast to an electrical power source comprises: routing a ground wire and a power wire through the interior of the mast; placing an insulation cap onto a mounting end of the mast; connecting the ground wire to a grounding collar placed on the insulation cap; connecting the power wire to a contact eyelet secured in the insulation cap; attaching a contact spring to a power terminal of an electrical connector, the electrical connector configured for connecting to the electrical power source; placing an insulation sleeve over the contact spring, and positioning the contact spring against the contact eyelet.

The additional features and advantages of the disclosed invention are set forth in the detailed description which follows, and will be apparent to those skilled in the art from the description or recognized by practicing the invention as described, together with the claims and appended drawings.

BRIEF DESCRIPTIONS OF THE DRAWINGS

The present invention addresses the task of providing a reliable electrical interface at the base of a mounted mast or whip antenna. The uses and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention. An anchor point apparatus is disclosed, suitable for use in quickly and rigidly attaching and releasing an upper portion of a mast-like pole to a support structure.

Certain terminology may be used in the following description for convenience and reference only, and will not be limiting. For example, the phrases "connected to," "secured to," or similar language include the definitions "indirectly connected to," "directly connected to," "indirectly secured to," and "directly secured to."

Figure 1:
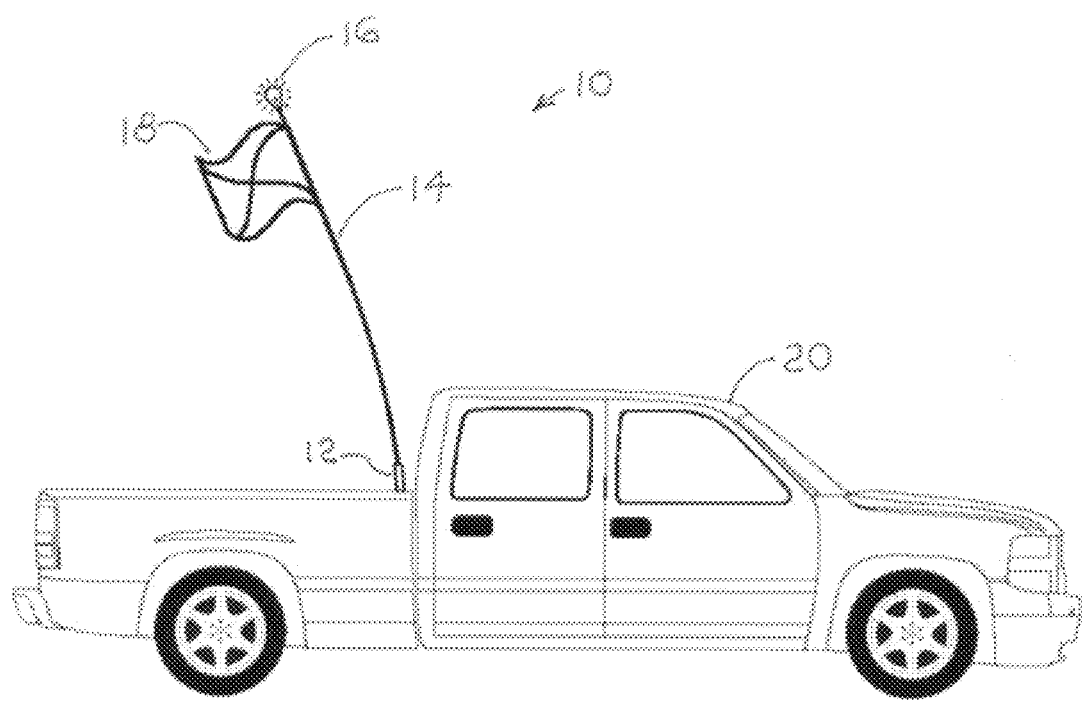
FIG. 1 is a diagrammatical illustration of a safety whip assembly with emergency light secured to a vehicle by means of a mounting base, in accordance with an aspect of the present invention.

As shown in FIG. 1, a mast assembly 10, here shown as a lighted safety whip, is mounted on a vehicle 20, such as a pickup truck. The mast assembly 10 may attach to a standard mount (not shown) on the vehicle 20 by a mounting base 12, in accordance with an embodiment of the present invention. It should be understood that the diameter of the mounting base 12 may be somewhat larger than the diameter of a flexible shaft 14 supported by the mounting base 12. Any one of an emergency light 16, a flag 18, a GPS component (not shown), or other electrical or electronic device, for example, may be provided at a distal end of the flexible shaft 14. As explained in greater detail below, the emergency light 16 receives electrical power via an electrical interface provided in the mounting base 12.

Figure 2:
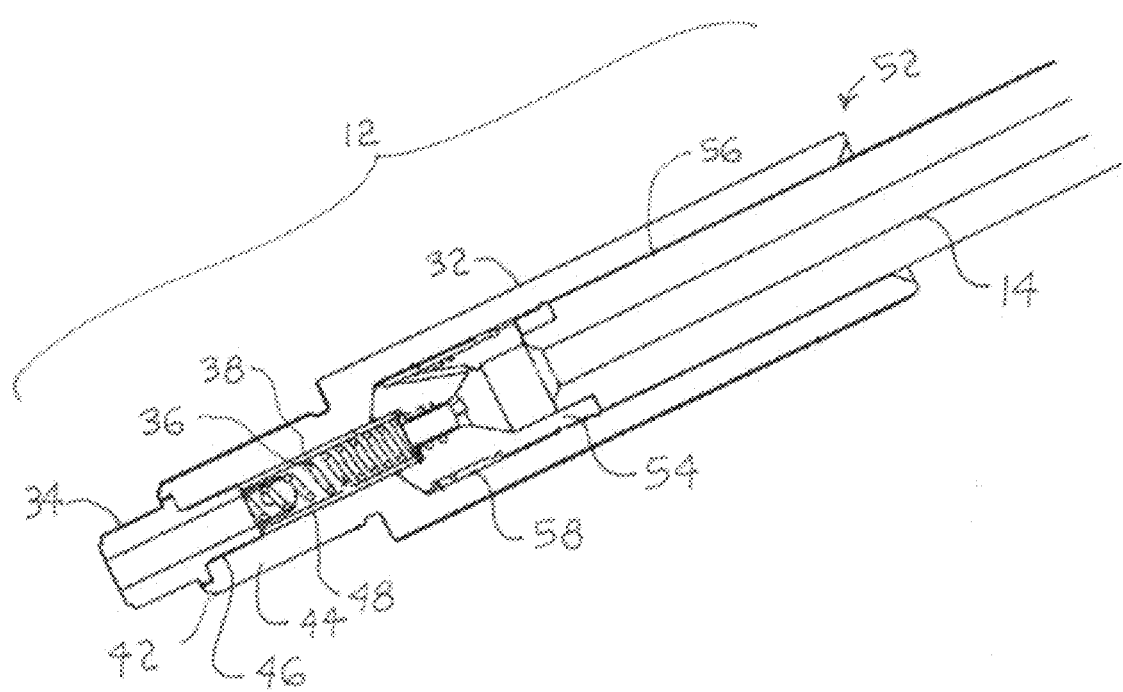
FIG. 2 is a cross-sectional view of the mounting base of FIG. 1.

FIG. 2 is a diagrammatical cross-sectional view of a mounting base 12, the lowermost section of the mast assembly 10. The mounting base 12 may comprise a base housing 32, a contact spring 36, and an insulation sleeve 38. The mounting base 12 further includes an electrical connector, here shown as an electrical socket 34. The base housing 32 includes a mounting stud 42 that is used to attach the base housing 32 to a mating fixture on the vehicle 20. In an exemplary embodiment, the outside surface 44 of the mounting stud 42 may be threaded, for screwing into a threaded mating fixture provided on the vehicle 20. The mounting stud 42 may include a electrical connector seat 46 that may be threaded to receive a threaded end of the electrical socket 34.

It can be appreciated that the mounting base 12 comprises the electrical socket 34 for use with the standard mount on the vehicle 20 that includes a mating electrical plug (not shown). For applications in which the standard mount on the vehicle 20 includes an electrical socket and not an electrical plug, the mounting base 12 will include the respective electrical plug (not shown), as is well known in the relevant art, in place of the conventional electrical socket 34. Accordingly, for such alternate applications, reference to an electrical plug instead of to an electrical socket, is intended and should be understood in the disclosure below.

Installation and removal of a threaded electrical socket 34 may be accomplished with a screwing/unscrewing effort. In an alternative embodiment, the electrical socket 34 may include a bayonet base (not shown), as is well-known in the relevant art. In such applications, the electrical connector seat 46 may be configured to accept and retain a bayonet base. Accordingly, installation and removal of a bayonet-style electrical socket 34 would require a twisting action. In yet another alternative embodiment, the electrical socket 34 may not be threaded, and may be held in the electrical connector seat 46 by means of a compression fit, or a press-fit configuration. In such applications, the electrical connector seat 46 may comprise a substantially cylindrical cavity having a diameter sized to provide the desired compression or press fit.

In an alternative embodiment, the electrical connector seat 46 and the electrical socket 34 may be configured such that an end of the electrical socket 34 is not threaded, and may be frictionally retained in a cylindrical electrical connector seat 46. The mounting base 12 may further include a through hole 48 configured to frictionally retain the insulation sleeve 38. Accordingly, in the configuration shown, the electrical socket 34, and the contact spring 36 can be advantageously removed and replaced if faulty or damaged, in contrast to conventional designs.

The base housing 32 further comprises a tubular section 52 that is configured to receive and retain the flexible shaft 14. In an exemplary embodiment, the flexible shaft 14 may be permanently secured within a cylindrical cavity 56 in the tubular section 52 by adhesive means, such as an epoxy. In an alternative embodiment, the flexible shaft may be removably retained in the cylindrical cavity 56 by means of a press-fit design, or with a threaded or bayonet-type configuration. As described in greater detail below, the mounting end of the flexible shaft 14 may be enclosed in an insulation cap 54, where the insulation cap 54 may be sized and shaped to fit over, or to butt against, the mounting end of the flexible shaft 14, and further sized and shaped so as to fit inside the cylindrical cavity 56. Placement of the flexible shaft 14 into the cylindrical cavity 56 functions to retain the insulation cap 54 at the base of the cylindrical cavity 56. If the flexible shaft 14 is permanently secured to the tubular section 52, the insulation cap 54 is effectively permanently retained at the base of the cylindrical cavity 56. A metallic grounding collar 58, fabricated from a resilient alloy such as beryllium-copper or similar electrically-conductive material, may be provided at one end of the insulation cap 54.

The electrical interface provided in the mast assembly 10 can be described with reference to FIG. 3, which provides a cross-sectional view of the mounting base 32 and flexible shaft 14 in an assembled state. Electrical power from the vehicle 20 can be provided to the emergency light 16, for example, via the electrical plug 34. A typical configuration for the electrical connector may be an RCA phono connector, which includes a exterior socket shell 62 and an interior socket power terminal 64, sometimes referred to as a solder terminal, where the socket power terminal 64 is electrically insulated from the socket shell 62, as can be appreciated by one skilled in the art.

In a conventional configuration, an electrical potential is provided to the socket power terminal 64, and the socket shell 62 is placed at ground potential. For a configuration in which an RCA phono plug (not shown) is provided in the mounting base 32, a plug shell would be in electrical contact with the mounting base 32, and an interior plug power terminal would be insulated from the plug shell. Accordingly, the electrical potential would be provided to the plug power terminal, and the plug shell would be placed at ground potential.

Electrical power provided to the socket power terminal 64 flows through the contact spring 36, and to a contact eyelet 66 which is retained in the insulation cap 54. The contact eyelet 66 may be fabricated from tin-plated brass, or a similar electrically-conductive material. As the flexible shaft 14 is hollow, a power wire 68 may be routed through an interior channel 74 located inside the flexible shaft 14, and may thus be electrically and mechanically connected to the contact eyelet 66, such as by crimping soldering, brazing, or welding. The power wire 68 is used to provide the electrical power to a device on the flexible shaft 14, such as the emergency light 16.

A ground wire 72 may be similarly routed inside the flexible shaft 14, and may further be electrically connected between the emergency light 16, for example, and the grounding collar 58 on the insulation cap 54. Return current flowing along the ground wire 72 may pass into the grounding collar 58, along the base housing 32, into the mounting stud 42, and into the socket shell 62, where the socket shell 62 is electrically connected to vehicle ground when the mounting base 12 is completely secured in the standard mount on the vehicle 20.

It can be appreciated by one skilled in the relevant art that both the power wire 68 and the ground wire 72 are individually, physically connected (i.e., by soldering or brazing) to respective electrical components, and that the disclosed ground wire electrical connection does not rely on a wire termination configuration provided by, for example, "wedging" the wire termination between the flexible shaft 14 and an adjacent electrical component.

Accordingly, the configuration of the mounting base 12 provides for a first (i.e., power) electrical path comprising the power wire 68, the contact eyelet 66, the contact spring 36, and the socket power terminal 64. A second (i.e., ground) electrical path provided by the configuration of the mounting base 12 comprises: the socket shell 62, the mounting stud 42, a segment of the base housing 32, the grounding collar 58, the attachment tab 96, and the ground wire 72. In an exemplary embodiment, the mounting stud 42 may be in electrical communication with the chassis ground of the vehicle 20. Accordingly, the socket shell 62 is maintained at the same electrical potential as the vehicle chassis.

Figure 4:
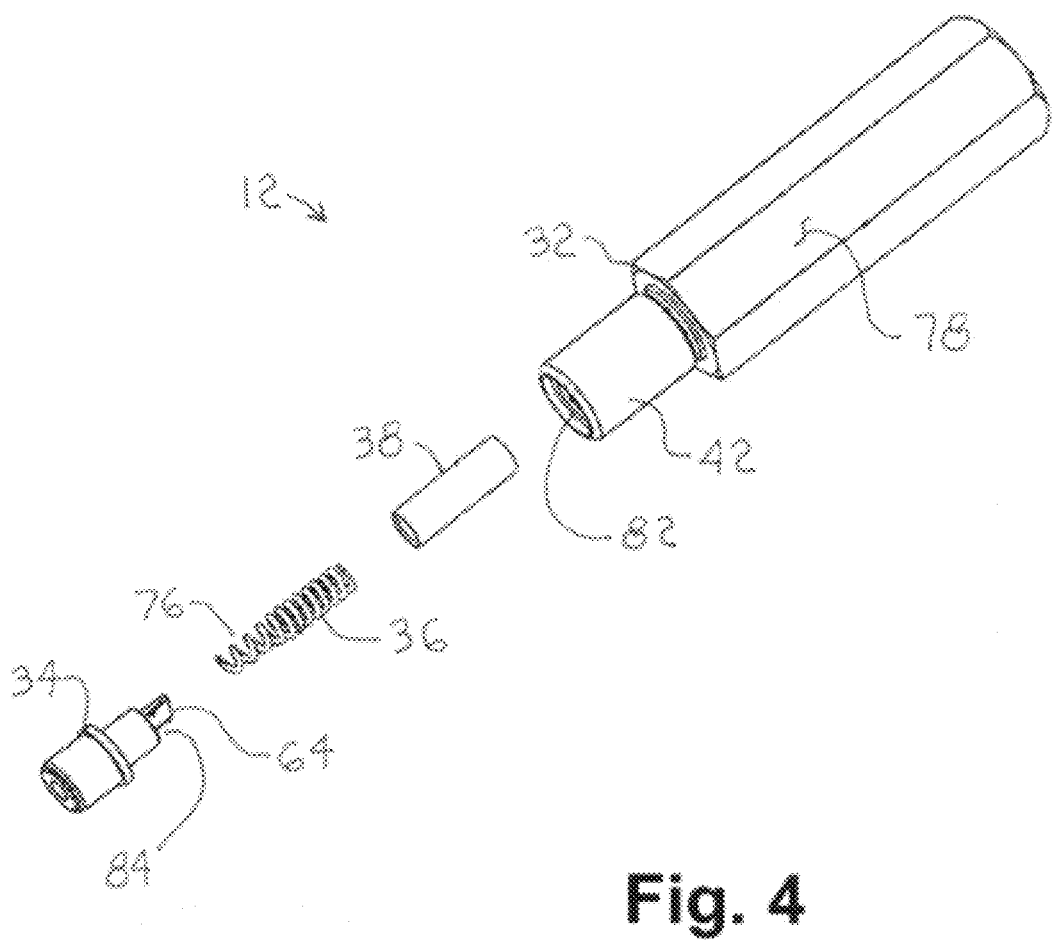
FIG. 4 is an exploded isometric diagrammatical view of the mounting base of FIG. 1.

FIG. 4 provides a detailed exploded isometric view of the mounting base 12. The contact spring 36 may be fabricated from spring wire, as is known in the art, and may include a tapered end 76 that is sized and shaped to fit inside, and be retained within, the socket power terminal 64. In an exemplary embodiment, the contact spring 36 may be soldered or brazed to the socket power terminal 64. The electrical socket 34, the contact spring 36, and the insulation sleeve 38 are placed into an opening 82 in the mounting stud 42 when the mounting base 12 is assembled. The assembled mounting base 12 can then be installed into the standard mount on the vehicle 20 by forcing in, or by screwing in, the mounting base 12. A predetermined length of the base housing 32 may be formed as a hexagonal cylinder 78, as shown in FIG. 4, so as to provide bearing surfaces for a fastening tool, such as a wrench or powered chuck.

Figure 5:
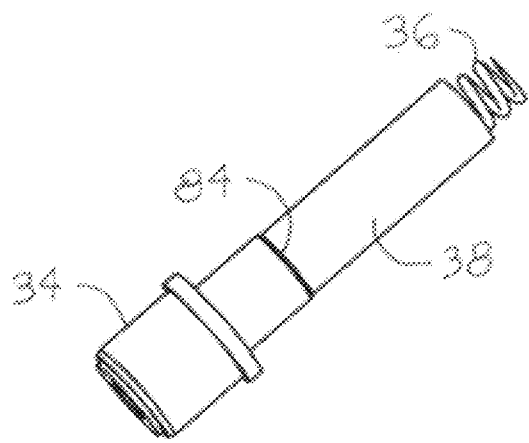
FIG. 5 is an isometric diagrammatical view of an electrical socket and insulation sleeve as used in the mounting base of FIG. 4.

The insulation sleeve 38 may be fabricated from a hard plastic material, and is sized and shaped to be installed over the contact spring 36 and over the socket power terminal 64. When the insulation sleeve 38 butts against a socket shell rim 84, as shown in FIG. 5, a portion of the contact spring 36 remains exposed beyond an end of insulation sleeve 38. Accordingly, when the flexible shaft 14 is inserted into the base housing 32, the contact spring 36 is thereby placed into a compressed state against the contact eyelet 66, and the exposed portion of the contact spring 36 is forced back into the insulation sleeve. This configuration functions to provide an assured electrical contact between the contact spring 36 and the contact eyelet 66.

Figure 6:
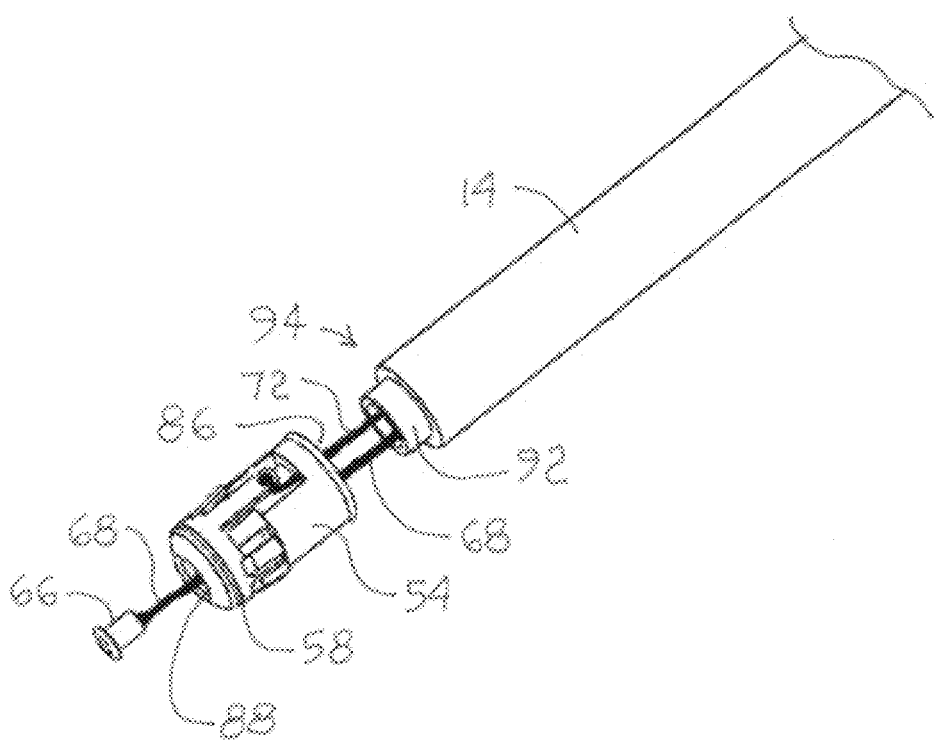
FIG. 6 is an isometric diagrammatical view of an insulation collar being attached to a flexible shaft, as used in the safety whip assembly of FIG. 1.

The flexible shaft 14 may include a shaft mesa 92, that is, a stepped-down smaller-diameter shaft section, at a shaft insertion end 94. The shaft mesa 92 is sized and shaped to fit into a cap base opening 86 of the insulation cap 54. In an alternative embodiment, the end of the flexible shaft 14 may comprise an essentially flat surface (not shown), that is, without the shaft mesa 92, such that the insulation cap 54 merely butts against the flat surface. The grounding collar 58 comprises a conductive material, such as metal, and may be configured to clamp onto an end of the insulation cap 54 substantially as shown in FIG. 6. The grounding collar 58 includes an attachment tab 96 that may be soldered, or otherwise electrically and mechanically connected, to the ground wire 72 after the grounding collar 54 has been installed on the insulation cap 54.

The power wire 68 is preferably electrically and mechanically connected to the contact eyelet 66 before the insulation cap 54 has been placed against the flexible shaft 14. In an exemplary embodiment, the insulation cap 54 may be fabricated from an electrically insulating material, such as a plastic or a composite, non-conductive material. The insulation cap 54 may optionally be secured to the end of the flexible shaft 14 with an adhesive, or may alternatively be held in a desired position when the flexible shaft 14 has been placed against the insulation cap 54. As described above, the flexible shaft 14 may be frictionally retained in, or otherwise optionally bonded to, the cylindrical cavity 56.

Figure 7:
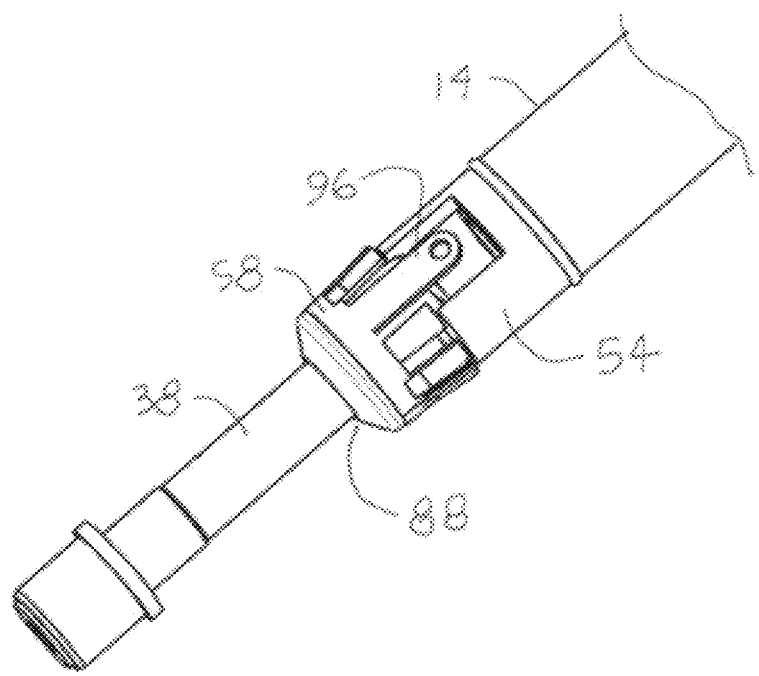
FIG. 7 is an isometric diagrammatical view of the electrical socket and insulation sleeve of FIG. 5, installed into the insulation collar of FIG. 6.

After the insulation cap 54 has been emplaced over the shaft mesa 92, the power wire 68 may be retracted into the interior of the flexible shaft 14 so as to allow the contact eyelet 66 to be secured in a contact eyelet seat 88 in the insulation cap 54. An end of the insulation sleeve 38, and a portion of the contact spring 36 are subsequently inserted into the contact eyelet seat 88 when the flexible shaft 14 is inserted into the base housing 32. This assembly configuration is shown in FIG. 7, where the base housing 32 and the ground wire 72 are not shown, for clarity of illustration.

Figure 8:
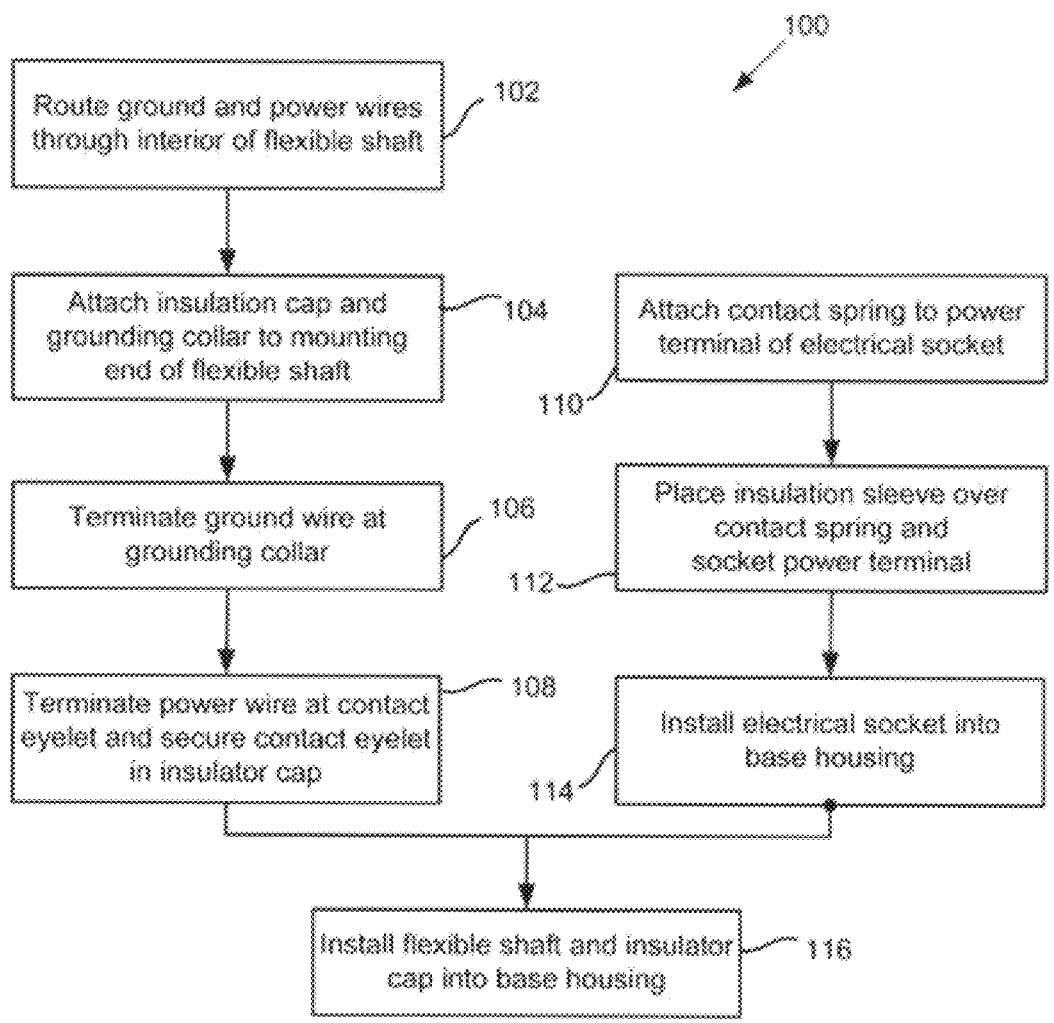
FIG. 8 is a block diagram describing the assembly and attachment of the flexible shaft of FIG. 6 to the mounting base of FIG. 4.

With the foregoing descriptions of the components that may be used in fabrication of the mast assembly 10, reference is made to the flow diagram 100 in FIG. 8 where a description is provided for the assembly and mating of the flexible shaft 14 with the mounting base 12, in accordance with an aspect of the present invention. The ground wire 72 and the power wire 68 may be routed through the interior channel 74 of the flexible shaft 14, at step 102. The insulation cap 54 may be attached to the mounting end of the flexible shaft 14, and the grounding collar 58 may be placed into a collar recess 122 (shown in FIG. 9) of the insulation cap 54, at step 104.

Alternatively, the grounding collar 58 may be placed onto the insulation cap 54 before the insulation cap 54 is attached to the flexible shaft 14. The ground wire 72 may be terminated at the attachment tab 96 of the grounding collar 58, at step 106. The power wire 68 may be terminated at the contact eyelet 66, and the contact eyelet 66 may be secured in the insulator cap 54, at step 108.

The contact spring 36 may be attached to the socket power terminal 64, at step 110, by soldering or brazing, for example. The insulation sleeve 38 may be placed over the contact spring 36 and the socket power terminal 64, at step 112, to insulate the socket power terminal 64 and the contact spring 36 from the base housing 32. The electrical socket 34 may be press fit into, twisted into, or screwed into, the electrical connector seat 46 in the mounting stud 42. The flexible shaft 14 may then be installed into the cylindrical cavity 56 of the tubular section 52, at step 116. In an exemplary embodiment, the flexible shaft 14 may be: (i) secured by means of an adhesive, such as an epoxy, (ii) retained in the cylindrical cavity 56 by a press-fit configuration, or (iii) mechanically secured such as by tightening a set screw (not shown) through the wall of the base housing 32 and against the side of the flexible shaft 14.

Figure 9:
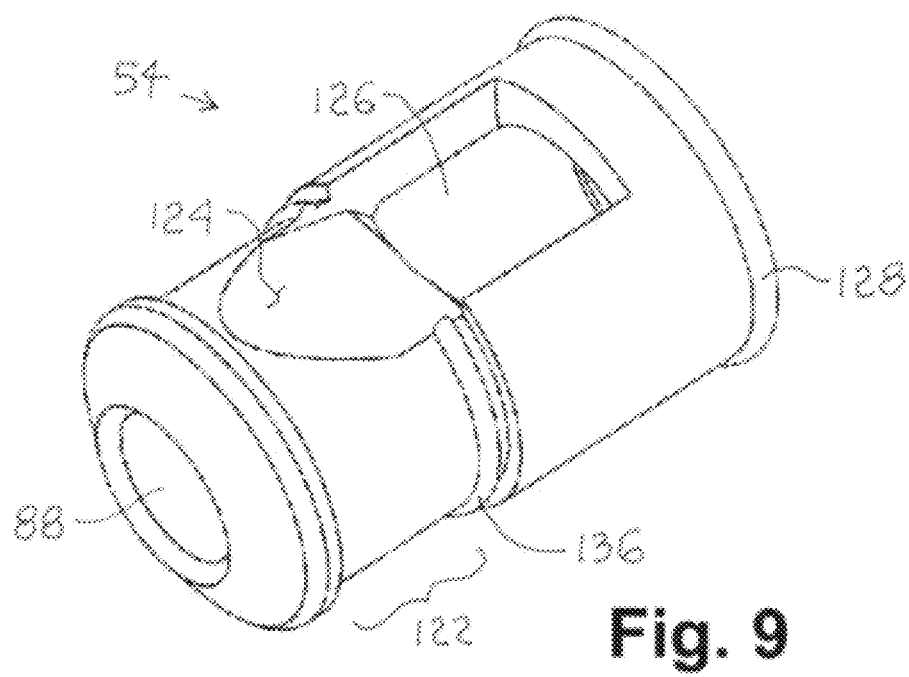
FIG. 9 is an isometric diagrammatical detail view of the insulation cap of FIG. 7.

FIG. 9 is a detailed isometric illustration of the insulation cap 54 showing the circumferential collar recess 122 configured to accommodate the grounding collar 58. In an exemplary embodiment, the grounding collar 58 is positioned in the collar recess 122 such that the attachment tab 96 is located over a tab flat 124, and further, that the attachment tab 96 partially extends over or into a slot opening 126. This slot configuration provides an access to connect the ground wire 72 to the attachment tab 96, as shown in FIG. 6.

The insulation cap 54 may include a sealing rim 128 to produce a compressive fit when the flexible shaft 14 and the insulation cap 54 are inserted into the cylindrical cavity 56 of the base housing 32. The sealing rim 128 may also function to prevent ambient moisture from entering the cylindrical cavity 56 and contacting the electrical connections at the terminations of the power wire 68 and the ground wire 72.

Figure 10:
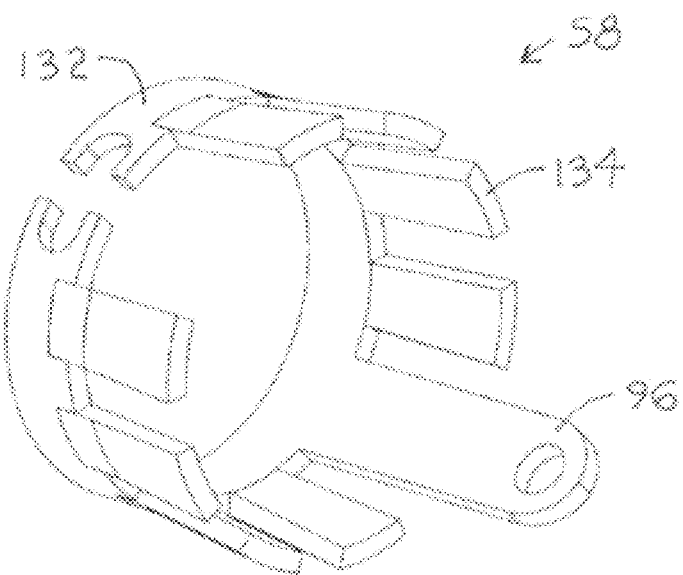
FIG. 10 is an isometric diagrammatical detail view of the grounding collar of FIG. 7.

FIG. 10 is a detailed isometric view of the grounding collar 58 showing the attachment tab 96 oriented in a longitudinal direction from a substantially circular split ring tab base 132. The grounding collar 58 also includes a plurality of collar contact fingers 134, disposed about the split-ring tab base 132 and similarly extending longitudinally from the split-ring tab base 132 to define a substantially cylindrical surface. Eight collar contact fingers 134 are shown, the design of the grounding collar may include more or fewer collar contact fingers 134, depending upon the particular application and requirements.

Figure 3:
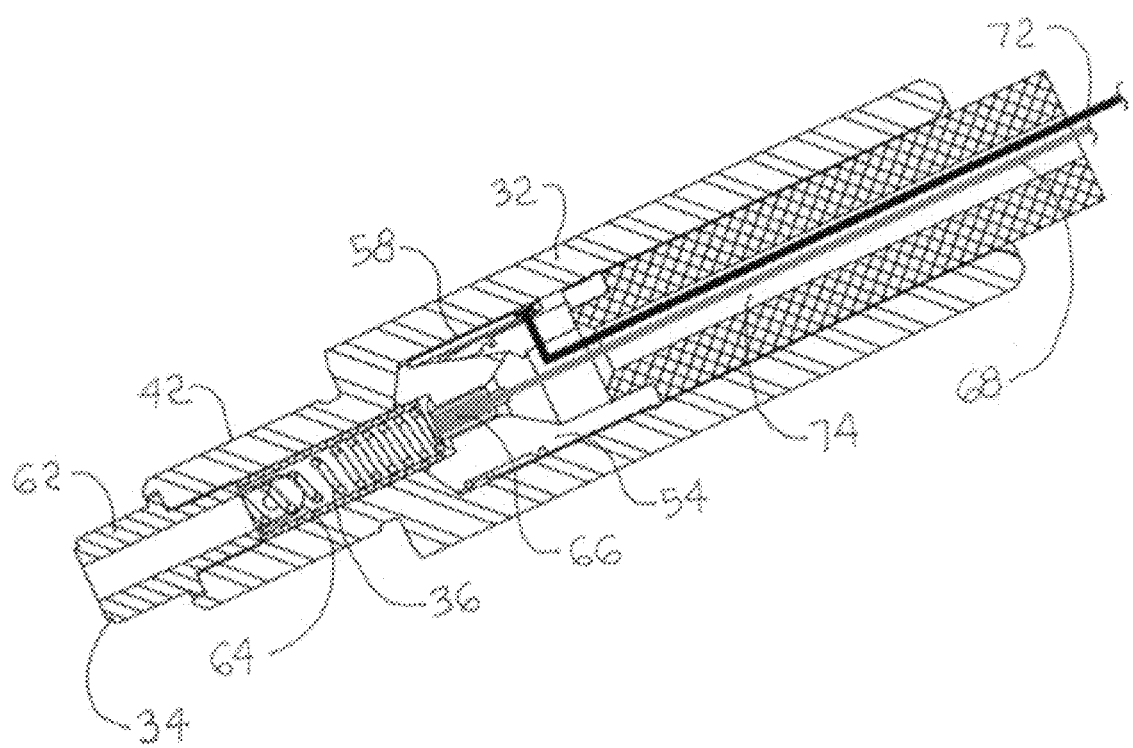
FIG. 3 is a detailed view of the cross-sectional view of FIG. 2 showing power wire and ground wire routing.

In an exemplary embodiment, the collar contact fingers 134 may be angled slightly, about five degrees for example, away from the longitudinal axis of the cylindrical surface to insure contact of the grounding collar 58 with the interior surface of the cylindrical cavity 56 of the base housing 32, when assembled as shown in FIG. 3. This configuration functions to provide a positive electrical contact between the grounding collar 58 and the base housing 32.

There may also be provided a circumferential protuberance 136 in the insulation cap 54, extending partially around the collar recess 122, shown in FIG. 9. The circumferential protuberance 136 may function to bear against, and thus force outwardly, each of the contact fingers 134 to provide electrical contact with the interior surface of the cylindrical cavity 56 of the tubular section 52. In this configuration, the circumferential protuberance 136 functions as a fulcrum point for each of the contact fingers 134, causing the tips of the contact fingers 134 to more positively engage the interior surface of the cylindrical cavity 56.

In an alternative embodiment, the contact fingers 134 may be slightly bowed outward, with the tips of the contact fingers 134 directed inwardly to the center of the grounding collar 58, such that the interior surface of the cylindrical cavity 56 makes electrical contact with an individual contact finger 134 primarily at mid-points of the contact fingers 134. This bowed configuration supports a removal process such that the flexible shaft 14 can be withdrawn from the cylindrical cavity without the tips of the contact fingers 134 binding on the surface of the cylindrical cavity 56. The bowed configuration of the contact fingers 134 may be used with or without the circumferential protuberance 136 emplaced on the collar recess 122.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

Furthermore, what has been described and illustrated herein are exemplary embodiments of the invention. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

What is claimed is:

1. A mounting base suitable for use in attaching a flexible shaft having electrical wires routed therethrough to an electrical device, said mounting base comprising:
    a base housing configured to retain the electrical device at a first base housing end, and further configured to retain the flexible shaft at a second base housing end, said base housing providing at least a portion of an electrical path between said electrical connector and a first electrical wire in the flexible shaft;
    a contact spring for providing an electrical connection to a power terminal on the electrical connector;
    a insulation sleeve substantially enclosing said contact spring;
    a contact eyelet electrically attached to a second electrical wire in the flexible shaft, said contact eyelet in electrical contact with said contact spring; and
    a grounding collar disposed against an end of the flexible shaft, said grounding collar disposed within an interior channel in said second base housing end.

2. The mounting base of claim 1 wherein said contact spring comprises a tapered end sized so as to fit inside said power terminal.

3. The mounting base of claim 1 wherein said grounding collar comprises an attachment tab configured for electrical attachment to said first electrical wire.

4. The mounting base of claim 1 wherein said grounding collar comprises a plurality of contact fingers configured to make electrical contact with said base housing.

5. The mounting base of claim 1 further comprising an electrical connector seat for retaining the electrical connector, said electrical connector seat configured to mate with any of a threaded electrical connector, an unthreaded electrical connector, or a bayonet-type electrical connector.

6. The mounting base of claim 1 further comprising an insulation cap, said insulation cap configured to fit onto said end of the flexible shaft.

7. The mounting base of claim 6 wherein said insulation cap comprises a contact eyelet seat sized such that said contact eyelet fits into said contact eyelet seat.

8. The mounting base of claim 6 wherein said insulation cap comprises a collar recess sized such that said grounding collar is retained in said collar recess.

9. A safety whip comprising:
    a flexible shaft;
    at least one of an emergency light, a flag, and a global positioning system device disposed at a first end of said flexible shaft;
    a mounting base connected to a second end of said flexible shaft, said mounting base having a grounding collar electrically connected to a ground wire disposed inside said flexible shaft, said grounding collar in electrical contact with said mounting base; and
    an insulation cap disposed against said second end of said flexible shaft, said insulation cap including a collar recess sized to retain said grounding collar.

10. The safety whip of claim 9 wherein said insulation cap comprises a slot opening for enabling electrical connection of said ground wire to said grounding collar.

11. The safety whip of claim 9 further comprising an electrical connector removably attached to said mounting base.

12. The safety whip of claim 9 further comprising a contact eyelet, said contact eyelet connected to a power wire disposed inside said flexible shaft.

13. The safety whip of claim 9 further comprising a contact spring, said contact spring in electrical contact with both an electrical connector attached to said mounting base and a contact eyelet connected to a power wire disposed inside said flexible shaft.

14. The safety whip of claim 13 further comprising an insulation sleeve enclosing said contact spring.

15. The safety whip of claim 9 wherein said grounding collar comprises a plurality of collar contact fingers, at least one of said plurality of contact fingers providing an electrical path between said ground wire and said mounting base.

16. A method for electrically connecting a mast to an electrical power source, said method comprising the steps of:
routing a ground wire and a power wire through the interior of the mast;
placing an insulation cap against a mounting end of the mast;
connecting said ground wire to a grounding collar placed on said insulation cap;
connecting said power wire to a contact eyelet secured in said insulation cap;
attaching a contact spring to a power terminal of an electrical connector, said electrical connector configured for connecting to the electrical power source;
placing an insulation sleeve over said contact spring, and positioning said contact spring against said contact eyelet.

17. The method of claim 16 further comprising the step of placing said grounding collar into a cylindrical cavity disposed in a base housing.

18. The method of claim 16 further comprising the step of securing said electrical connector in an electrical connector seat disposed in a base housing.

19. The method of claim 16 wherein said grounding collar comprises a split ring tab base, an attachment tab attached to said split ring tab base, and a plurality of collar contact fingers disposed about said split-ring tab base.

\* \* \* \* \*